United States Patent
Rofougaran et al.

(10) Patent No.: US 8,207,825 B2
(45) Date of Patent: Jun. 26, 2012

(54) RFID READER WITH RECEIVER CLOCK DERIVED FROM TRANSMITTER OUTPUT

(75) Inventors: Ahmadreza (Reza) Rofougaran, Newport Coast, CA (US); Maryam Rofougaran, Rancho Palos Verdes, CA (US); Amin Shameli, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1224 days.

(21) Appl. No.: 11/941,740

(22) Filed: Nov. 16, 2007

(65) Prior Publication Data

US 2008/0238622 A1    Oct. 2, 2008

Related U.S. Application Data

(60) Provisional application No. 60/921,221, filed on Mar. 30, 2007, provisional application No. 60/932,411, filed on May 31, 2007.

(51) Int. Cl.
   *H04Q 5/22*    (2006.01)

(52) U.S. Cl. .................................... 340/10.1; 340/572.4

(58) Field of Classification Search .................... 340/1.1, 340/10.1
See application file for complete search history.

(56) References Cited

U.S. PATENT DOCUMENTS

| | | | |
|---|---|---|---|
| 5,675,342 A | * | 10/1997 | Sharpe ........................ 340/10.2 |
| 2006/0238301 A1 | * | 10/2006 | Wu et al. ..................... 340/10.1 |

* cited by examiner

*Primary Examiner* — Brian Zimmerman
*Assistant Examiner* — Sara Samson
(74) *Attorney, Agent, or Firm* — Garlick & Markison; Jessica W. Smith

(57) ABSTRACT

An RFID reader is operable to receive an inbound RF signal during transmission of an outbound RF signal. The inbound RF signal may be a modulated, backscattered signal from a tag that has substantially the same frequency as the outbound RF signal or at a different frequency from the outbound RF signal. The receiver section of the RFID reader is operable to down convert the inbound RF signal by using a transmitter signal generated by the transmitter section to generate at least one local oscillation signal. The receiver section then processes and digitizes the down converted inbound RF signal to produce an encoded inbound signal.

21 Claims, 7 Drawing Sheets

RFID READER WITH RECEIVER CLOCK DERIVED FROM TRANSMITTER OUTPUT

CROSS REFERENCE TO RELATED PATENTS

This US patent application claims priority under 35 USC §119 to a provisionally filed patent application entitled, "RFID System," having a provisional filing date of Mar. 30, 2007, and a provisional application Ser. No. 60/921,221. This US patent application claims priority under 35 USC §119 to a provisionally filed patent application entitled, "RFID System," having a provisional filing date of May 31, 2007, and a provisional Ser. No. 60/932,411.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communication systems and more particularly to RFID systems.

2. Description of Related Art

A radio frequency identification (RFID) system generally includes a reader, also known as an interrogator, and a remote tag, also known as a transponder. Each tag stores identification or other data for use in identifying a person, item, pallet or other object or data related to a characteristic of a person, item, pallet or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RFID reader then also generates an unmodulated, continuous wave (CW) signal to activate and power the tag. The RFID tag converts the CW signal into stored power to respond to the RFID reader and uses a backscattering technique in which the tag modulates and reflects the CW signal back to the RFID reader. The RF response from the tag includes the coded data stored in the RFID tag. The RFID reader decodes the coded data to identify or determine the characteristics of a person, item, pallet or other object associated with the RFID tag.

RFID systems typically employ either far field or near field technology. In far field technology, the distance between the RFID reader and the tag is great compared to the wavelength of the carrier signal. Typically, far field technology uses carrier signals in the ultra high frequency or microwave frequency ranges. In far-field applications, the RFID reader generates and transmits an RF signal via an RF antenna to all tags within range of the RF antenna. Tags employing far field technology RF coupling at microwave or UHF have been used in applications involving shipping units such as pallets or carton level tracking or other applications needing long-distance reads.

In near-field technology, the operating distance is usually less than one wavelength of the carrier signal, and the reading range is approximately limited to 20 cm or less depending on the frequency. In near field applications, the RFID reader and tag communicate via electromagnetic or inductive coupling between corresponding reader and tag coil antennas. Typically, the near field technology uses carrier signals in the low frequency range. Generally, tags employing near field technology operating at LF or HF have been used in applications involving item-level tagging for inventory control in the supply chain management or applications involving short range reads such as smart cards or vicinity credit cards, e.g. for access control or monetary use, passports, money bills authentication, bank documents, etc. Such applications do not need long range reads of the tags but may need more security provided by near field technology. In addition, near field technology is known for better performance on tags near fluids, such as fluid medications, wherein far field RF coupling tends to incur interference from the fluids.

Currently, an RFID reader consists of a controller or microprocessor implemented on a CMOS integrated circuit and a transmitter and receiver implemented on one or more separate CMOS, BiCMOS or GaAs integrated circuits. It is desirable to reduce the size and power consumption and cost of the RFID reader for both near field and far field applications. In addition, to avoid blocking RF component from the transmitted signal, currently RFID readers and tags operate wherein the RF signal from the reader to tag must end before the RF signal from the tag to reader can begin. This mode of operation is undesirable and slows communications between readers and tags. Therefore, a need exists for a highly integrated, low-cost RFID reader that can operate in with passive and active tags in both near field mode and far field mode while simultaneously transmitting and receiving.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF EMBODIMENTS OF THE INVENTION

Figure 1:
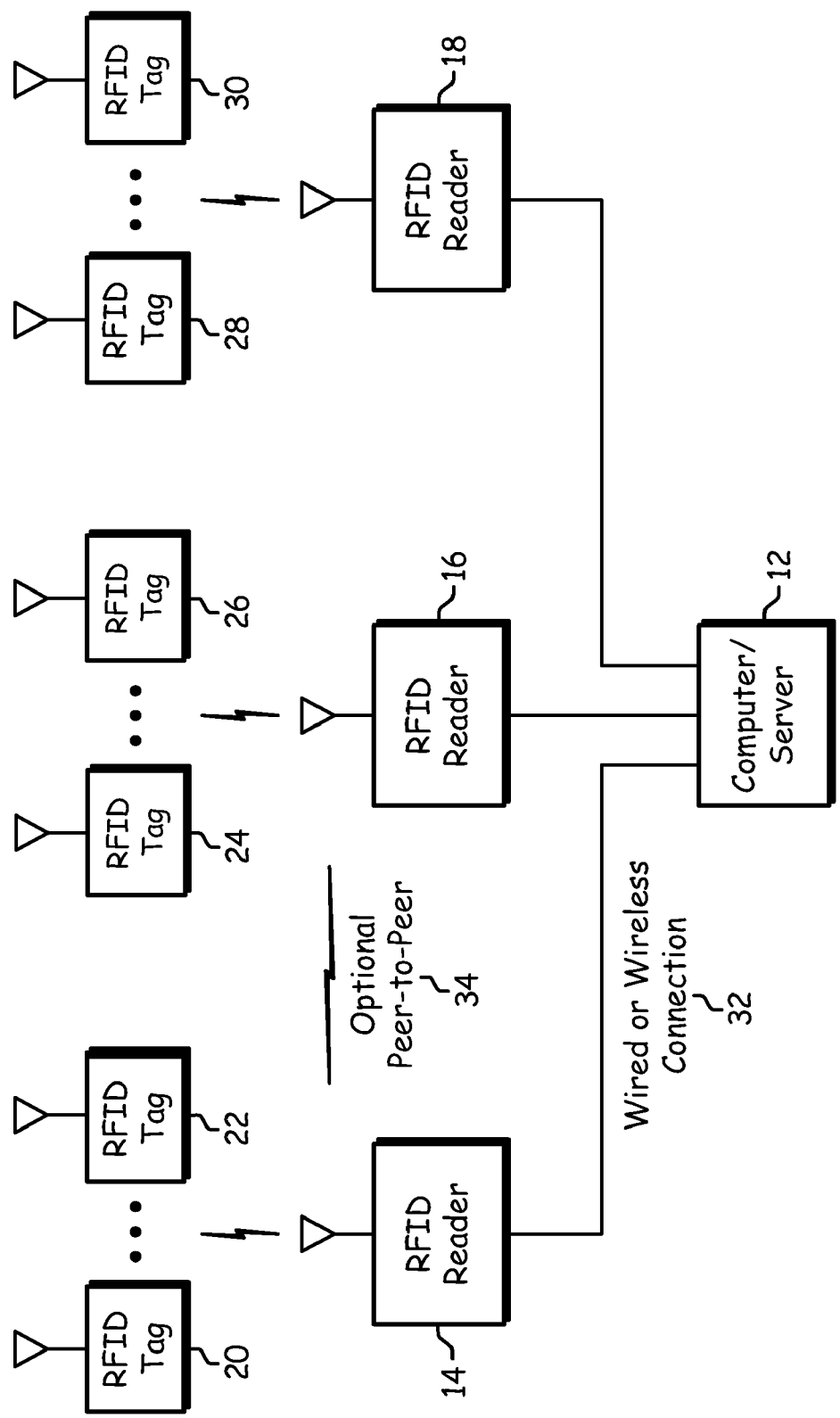
FIG. 1 is a schematic block diagram of an embodiment of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera. The RFID tags 20-30 may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In far field mode of operation, the RF communication scheme between the RFID readers 14-18 and RFID tags 20-30 is a backscatter coupling technique using far field technology whereby the RFID readers 14-18 request data from the RFID tags 20-30 via an RF signal, and the RF tags 20-30 respond with the requested data by modulating and backscattering the RF signal provided by the RFID readers 14-18. In a near field mode of operation, the RF communication scheme between the RFID readers 14-18 and RFID tags 20-30 is a magnetic or inductive coupling technique whereby the RFID readers 14-18 magnetically or inductively couple to the RFID tags 20-30 to access the data on the RFID tags 20-30. Thus, in one embodiment of the current invention, the RFID readers 14-18 may communicate in a far field mode to an RFID tag 20-30 with far field mode capabilities and in a near field mode to an RFID tag 20-30 with near field mode capabilities.

The RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag 20-30 can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

In other embodiments, the RFID system of FIG. 1 may be expanded to include a multitude of RFID readers 14-18 distributed throughout a desired location (for example, a building, office site, et cetera) where the RFID tags 20-30 may be associated with access cards, smart cards, mobile phones, personal digital assistants, laptops, personal computers, inventory items, pallets, cartons, equipment, personnel, et cetera. In addition, it should be noted that the computer/server 12 may be coupled to another server and/or network connection to provide wide area network coverage.

Figure 2:
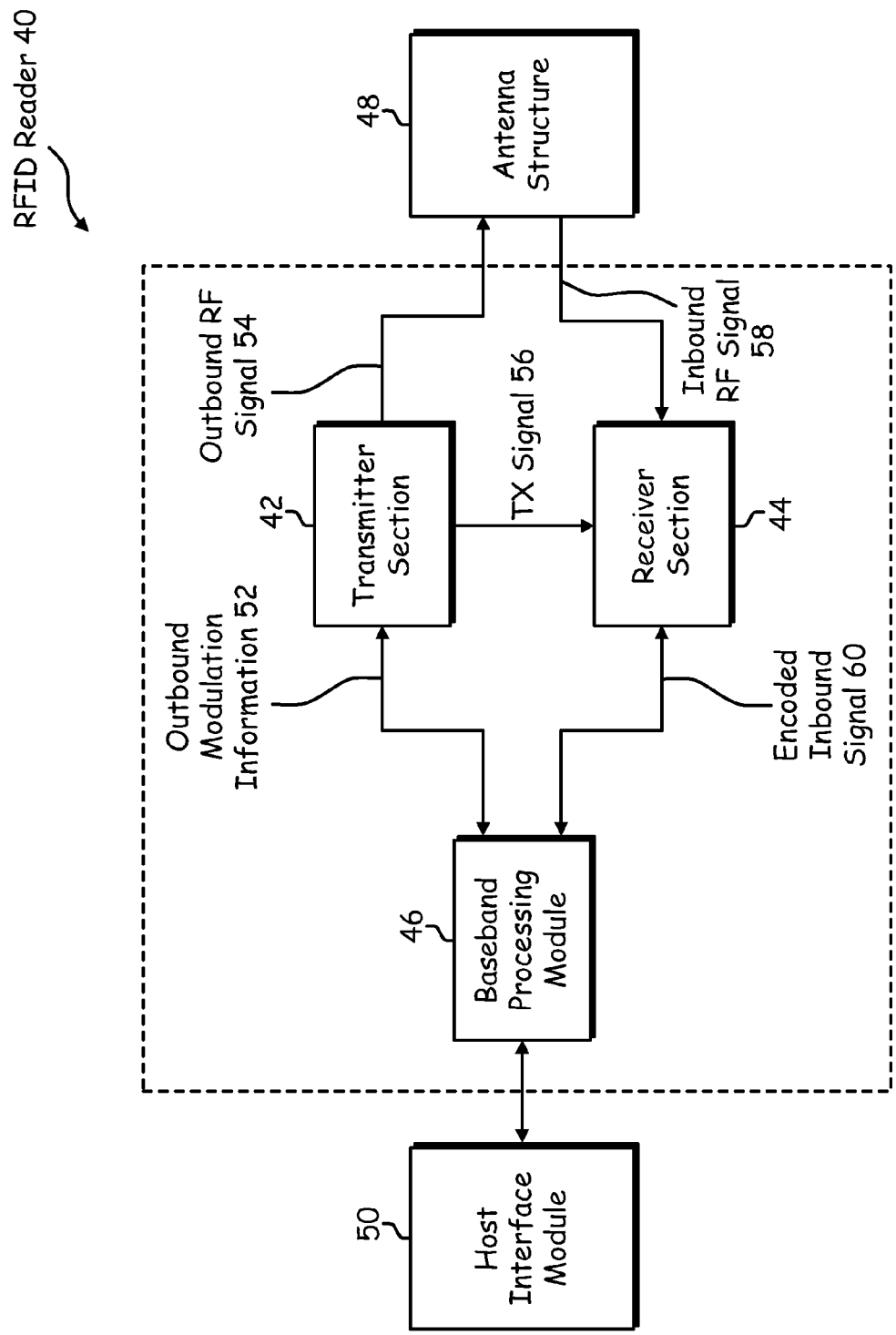
FIG. 2 is a schematic block diagram of an embodiment of an RFID reader in accordance with the present invention.

FIG. 2 is a schematic block diagram of an embodiment of an RFID reader 40 which can be used as one of the RFID readers 14-18 in FIG. 1. The RFID reader 40 includes a transmitter section 42, a receiver section 44 and baseband processing module 46. The baseband processing module 46 is also coupled to a host interface module 50. The host interface module 50 may include a communication interface (USB dongle, compact flash or PCMCIA) to a host device, such as the computer server 12. The multi-mode RFID reader 40 also includes an antenna structure 48 that is coupled to both the transmitter section 42 and receiver section 44.

The transmitter section 42, receiver section 44, baseband processing module 46 and host interface module 50 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module executes, hard coded and/or operational instructions corresponding to at least some of the steps and/or functions illustrated in FIGS. 1-7.

In operation, the baseband processing module 46 may receive one or more commands or requests for data from the host interface module 50 that requires communication of data to one or more RFID tags 20-30. Alternatively, or in addition to, the baseband processing module 46 may receive data from an RFID tag 20-30 that requires a response to be generated by the multi-mode RFID reader 40. As another alternative, or in addition to, the baseband processing module 46 may determine itself that a command or other communication is necessary to one or more RFID tags 20-30. In response to the required communication, the baseband processing module 46 converts outbound data to the outbound modulation information 52 for communication to one or more RFID tags 20-30.

The outbound modulation information 52 is transmitted to the transmitter section 42. In response to the outbound modulation information 52, the transmitter section 42 is operable to generate a modulated, up-converted outbound RF signal 54 at a carrier frequency $F_A$ in the RF band or microwave band. In one embodiment, the carrier frequency $F_A$ is a standardized carrier frequency in the RFID field, such as one or more frequencies specified in the ISO 18000 series or specified by the EPCglobal standards or other RFID standards. Upon completion of the modulated outbound RF signal 54, the transmitter section 42 then generates an unmodulated, continuous wave (CW) outbound RF signal 54 at the carrier frequency $F_A$. The CW outbound RF signal 54 is operable to power a passive or semi-passive RFID tag 20-30.

The antenna structure 48 is operable to transmit the outbound RF signal 54. The antenna structure 48 may be an RF type antenna structure operable to transmit the outbound RF signal 54 via RF coupling in a far field RFID reader 40 or a coil type antenna structure operable to transmit the outbound RF signal 54 via inductive or magnetic coupling in a near field RFID reader 40.

To receive signals, an inbound RF signal 58 is detected by the antenna structure 48. The antenna structure 48 is operable to receive the inbound RF signal 58 via RF coupling in a far field RFID reader 40 or via inductive or magnetic coupling in a near field RFID reader 40. In one embodiment, the RFID reader 40 is operable to receive the inbound RF signal 58 during transmission of the outbound RF signal 54, as explained in more detail below. The inbound RF signal 58 may be a modulated, backscattered signal from a tag that has substantially the same frequency as the outbound RF signal 54. In another embodiment, the inbound RF signal 58 may be a different frequency from the outbound RF signal 54.

The antenna structure 48 provides the inbound RF signal 58 to the receiver section 44. The receiver section 44 is operable to down convert the inbound RF signal 54 by using a transmitter signal 56 generated by the transmitter section 42. The receiver section 44 then processes and digitizes the down converted inbound RF signal to produce an encoded inbound signal 60. The encoded inbound signal 60 is transmitted to the baseband processing module 46 for converting the encoded inbound signal 60 into inbound data.

Figure 3:
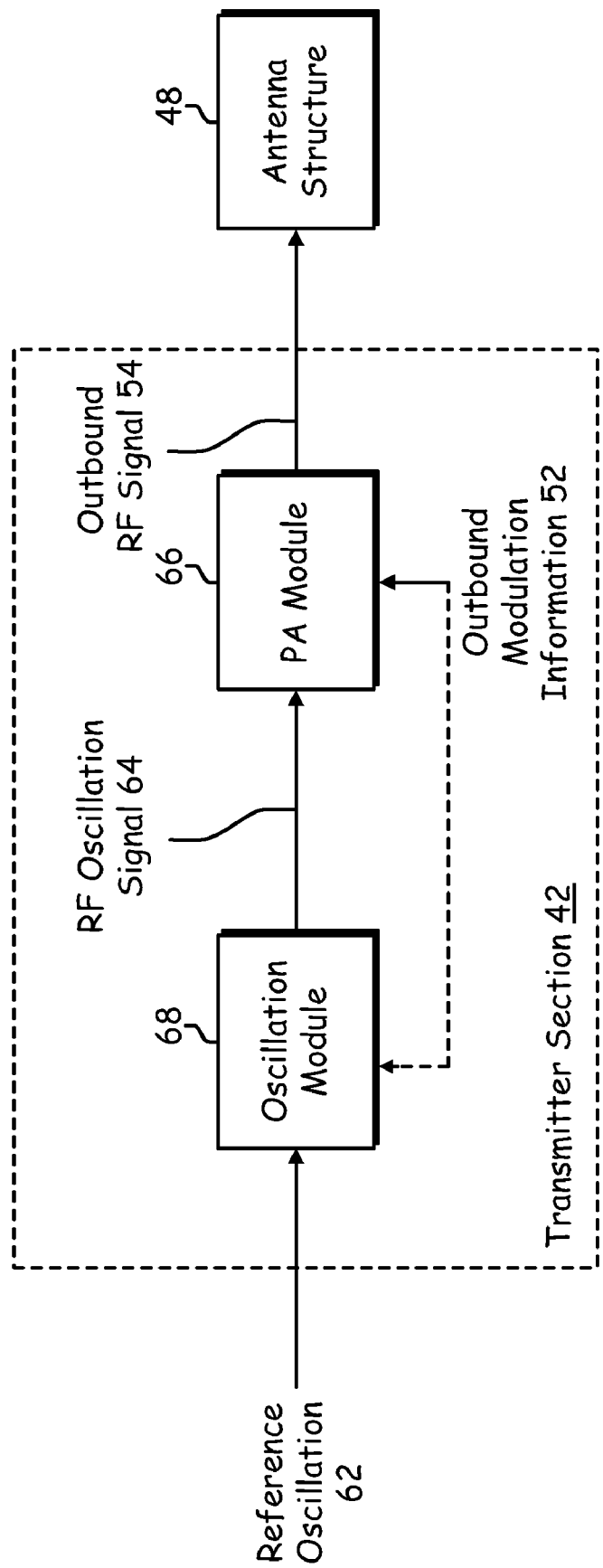
FIG. 3 is a schematic block diagram of an embodiment of a transmitter section of an RFID reader in accordance with the present invention.

FIG. 3 illustrates one embodiment of the transmitter section 42 of the RFID reader 40 in more detail. As seen in FIG. 3, the transmitter section 42 includes an oscillation module 68, power amplifier module 66 and antenna structure 48. In one embodiment, the oscillation module 68 receives a reference oscillation signal 62 and generates an RF oscillation signal 64 at a desired frequency $F_A$. The RF oscillation signal 64 is then directly modulated by the power amplifier module 66 in response to the outbound modulation information 52. The power amplifier module 66 then amplifies and outputs a generated outbound RF signal 54. To generate an unmodulated, continuous wave (CW) signal, the power amplifier module 66 amplifies the RF oscillation signal 64 to generate the outbound RF signal 54 without modulation. In this embodiment, the outbound modulation information 52 is one or more of amplitude shift keying (ASK), amplitude modulation (AM) or other type, variations or extensions thereof.

In another embodiment, the oscillation module 68 may be operable to receive the outbound modulation information 52, as shown in dotted lines in FIG. 3, generated by the baseband processing module 46. In this embodiment, the outbound modulation information 52 includes phase and/or frequency modulation information. The oscillation module 68 would also be operable to modulate the RF oscillation signal 64 in response to the phase and/or frequency outbound modulation information 52. The power amplifier module 66 then amplifies the modulated RF oscillation signal 64 and outputs the generated outbound RF signal 54. To generate an unmodulated, continuous wave (CW) signal, the oscillation module 68 does not modulate the RF oscillation signal 64. In this embodiment, the outbound RF signal 54 may have one or more of the following modulations: binary phase shift keying (BPSK), quadrature PSK (QPSK), phase shift keying (PSK), frequency shift keying (FSK) or other type, variations or extensions of phase or frequency type modulation.

In one embodiment, a tag antenna detects the outbound RF signal 54 and reflects a portion of the RF signal as a backscattered signal. In one embodiment, the tag is operable to modulate the backscattered signal by altering a load connected to the tag's antenna. For example, a load resistor $_{RL}$ connected in parallel with the tag's antenna is switched on and off in time with the modulation data information to be transmitted to change the amplitude of the backscattered signal. A small proportion of this backscattered, modulated signal is detected by the RFID reader's antenna structure 48 as the inbound RF signal 58. In this embodiment, the carrier frequency $_{FB}$ of the inbound RFID signal 58 may be substantially similar to the carrier frequency $_{FA}$ of the outbound RF signal 54.

In another embodiment, the modulation by the tag of the backscattered signal creates one or more subcarrier frequencies and so the frequency $F_B$ of the inbound RFID signal 58 may be slightly higher or lower depending on the encoding of the modulation data information at the tag. For example, if the carrier frequency $F_A$ of the outbound RF signal is 13.56 MHz, and the tag switches the load resistor at a rate of 500 kHz to modulate the backscattered signal, then two new subcarrier frequencies will appear at 13.810 MHz and 13.310 MHz. Such subcarrier frequencies are common when the tag employs Manchester coding or FM0 or FM1 type coding wherein each bit includes one or more transitions. In this embodiment, the subcarrier frequency $F_B$ of the inbound RFID signal 58 may be different, e.g. slightly higher and/or lower than the carrier frequency $F_A$ of the outbound RF signal 54.

In another embodiment, the tag detects the outbound RF signal 54 and derives a subharmonic signal. In this subharmonic embodiment, a second frequency $F_B$, which is usually lower by a factor of two, is derived by digital division of the carrier frequency $F_A$ of the outbound RF signal 54. An output signal of the tag at a frequency $F_B$ is then modulated. The modulated signal is then fed back into the tag's antenna via an output driver and a portion of the modulated tag signal is detected by the antenna structure 48 of the RFID reader 40 as the inbound RF signal 58. In this embodiment, the frequency $F_B$ of the inbound RF signal 58 is different from the frequency $F_A$ of the outbound RF signal 54.

Figure 4:
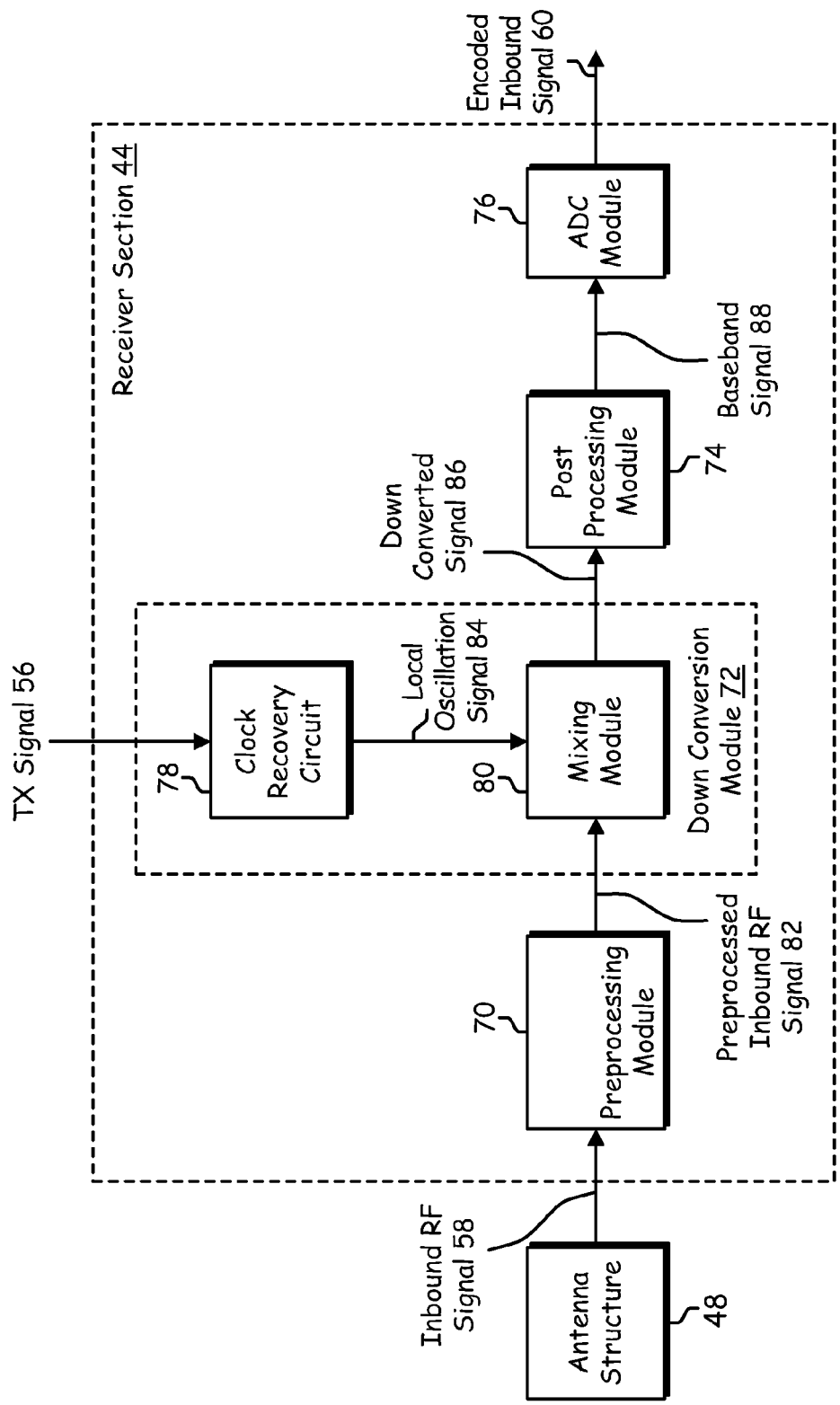
FIG. 4 is a schematic block diagram of an embodiment of a receiver section of an RFID reader in accordance with the present invention.

FIG. 4 illustrates one embodiment of the receiver section 44 of the RFID reader 40 in more detail. The receiver section 44 includes a preprocessing module 70, a down conversion module 72, a post processing module 74 and analog-to-digital (ADC) module 76. The down conversion module includes a clock recovery circuit 78 and mixing module 80. In this embodiment, the inbound RF signal 58 has been modulated by the tag as described above with one or more of amplitude shift keying (ASK), amplitude modulation (AM) or other type, variations or extensions thereof. In another embodiment, the inbound RF signal 58 may have been modulated with one or more of the following modulations: binary phase shift keying (BPSK), quadrature PSK (QPSK), phase shift keying (PSK), frequency shift keying (FSK) or other type, variations or extensions of phase or frequency type modulation. In such an embodiment, the receiver section 44 would need to be revised accordingly.

In operation with respect to the embodiment wherein the inbound RF signal 58 has been modulated by the tag as described above with one or more of amplitude shift keying (ASK), amplitude modulation (AM) or other type, variations or extensions thereof, the preprocessing module 70 receives the inbound RF signal 58 from the antenna structure 48. The preprocessing module 70 may include a low noise amplifier (LNA) and/or other pre-processing filters. In one embodiment, the preprocessing module includes attenuation and active blocking rejection modules to minimize blocking RF components of the inbound RF signal 58. These attenuation and active blocking rejection modules are described in more detail in U.S. patent application Ser. No. 12/040,685, filed Feb. 29, 2008, entitled, "RFID Reader with Active Blocking Rejection". The preprocessing module 70 generates a preprocessed inbound RF signal 82 for transmission to the down conversion module 72.

The down conversion module 72 includes a clock recovery circuit 78 and a mixing module 80. In one embodiment, the down conversion module 72 employs direct conversion. In direct conversion, the frequency of the preprocessed inbound RF signal 82 is down converted to the desired frequency in one conversion without first down converting to an intermediate frequency as in heterodyne type receivers. Using direct conversion eliminates components and decreases the size and cost of the RFID receiver 40. In operation, the clock recovery circuit 78 in the down conversion module 72 receives a transmitter signal 56 from the transmitter section 42. Using the transmitter signal 56, the clock recovery circuit 78 is operable to generate at least one local oscillation signal 84. The mixing module 80 is operable to mix the at least one oscillation signal 84 with the preprocessed inbound RF signal 82 to produce a down converted signal 86.

In another embodiment, the down conversion module 72 may also be a heterodyne or superheterodyne type conversion module wherein the down conversion module 72 is operable to first down convert the preprocessed inbound RF signal 82 into an intermediate frequency signal. The down conversion module 72 would then be operable to mix the intermediate frequency signal with the at least one oscillation signal 84 to produce a down converted signal 86.

The down converted signal 86 is then processed by the post processing module 74. The post processing module 74 is operable to filter the down converted signal 86 to reduce blocking RF signal components and DC offset in the down converted signal 86 and to produce a baseband signal 88. The baseband signal 88 is digitized by the ADC module 76 into the encoded inbound signal 60. The encoded inbound signal 60 is processed by the baseband processing module 46.

Figure 5:
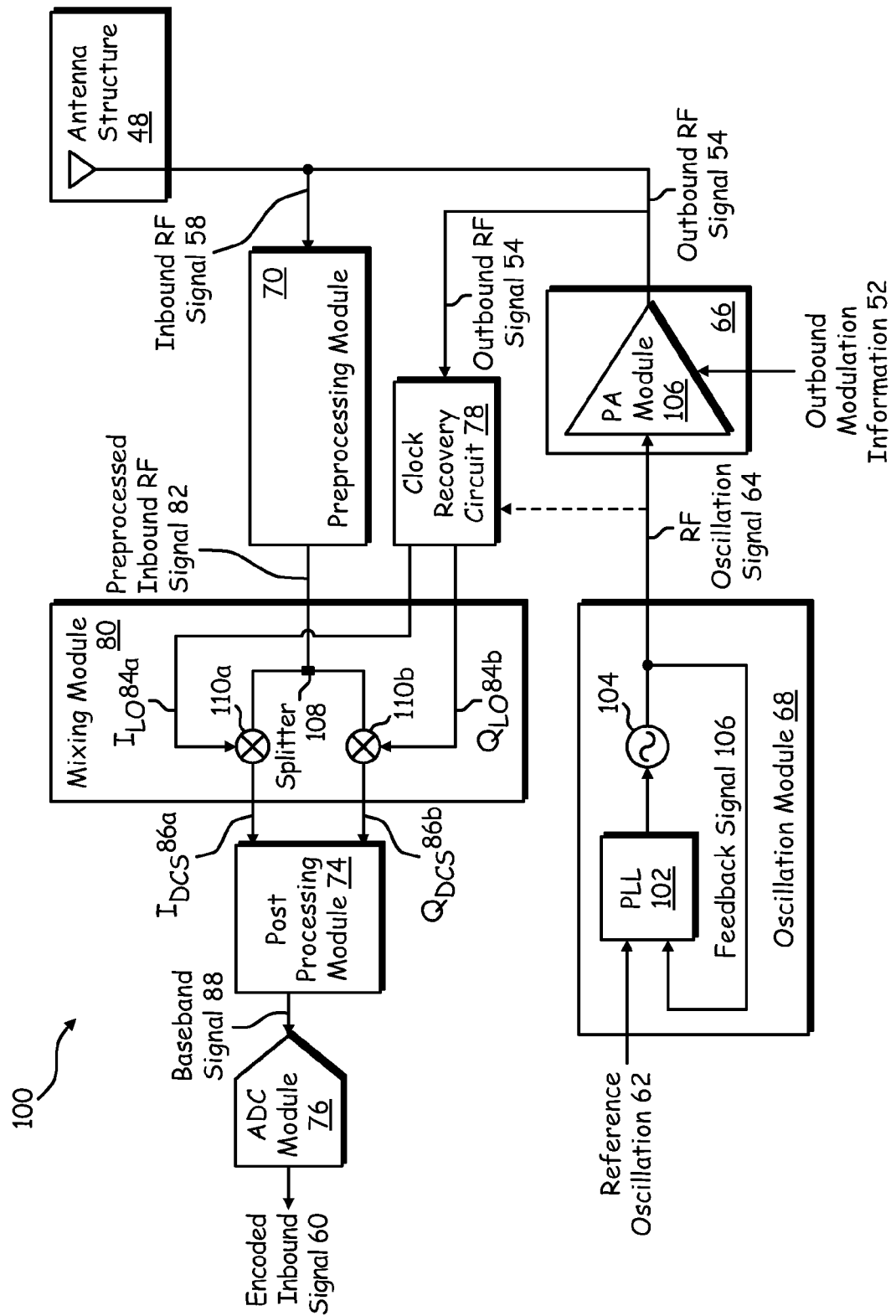
FIG. 5 is a schematic block diagram of an embodiment of a transceiver of an RFID reader in accordance with the present invention.

FIG. 5 illustrates one embodiment of a transceiver 100, including the transmitter section 42 and receiver section 44, of the RFID reader 40 in more detail. The oscillation module 68 includes in this embodiment, a phase lock loop 103 and current source 104. The phase lock loop 102 and feedback signal 106 lock the RF oscillation signal 64 at the carrier frequency $F_A$ indicated by the reference oscillation signal 62. The RF oscillation signal 64 is modulated by the power amplifier module 66. In one embodiment, the power amplifier module 66 includes power amplifier module 106 and is operable to perform direct modulation of the RF oscillation signal 66. Direct modulation is used in this embodiment to reduce cost and size. The power amplifier module 106 directly modulates the RF oscillation signal in response to the outbound modulation information 52 to produce the outbound RF signal. The power amplifier also amplifiers the outbound RF signal 54. In another embodiment, the power amplifier module 66 may be operable to first modulate the RF oscillation signal in an up conversion processing module and then amplify the up converted signal with a power amplifier to generate the outbound RF signal 54.

In one embodiment, the outbound RF signal 54 is transmitted to the clock recovery circuit 48. The clock recovery circuit may be a resistor/capacitor circuit or other type of circuit or a processing module that is operable to phase shift the outbound RF signal 54 to produce two local oscillation signals, a first in-phase local oscillation signal $I_{LO}$ 84a and a second quadrature local oscillation signal $Q_{LO}$ 84b. In an alternate embodiment, the clock recovery circuit receives the RF oscillation signal 64 as an input and is operable to phase shift the RF oscillation signal 64 to produce the two local oscillation signals $I_{LO}$ and $Q_{LO}$.

The outbound RF signal 54 is also transmitted by the antenna structure 48. In the embodiment of FIG. 5, the antenna structure 48 is an RF antenna operable to transmit the outbound RF signal 54 via RF coupling. In one embodiment, the antenna structure 48 comprises a single RF antenna used for both transmitting the outbound RF signal 54 and receiving the inbound RF signal 58. In one embodiment, an isolation structure or method may be used to isolate the transmit and receive signals. In another embodiment, the antenna structure 48 may comprise two RF antennas: a first antenna for transmitting the outbound RF signal 54 and a second antenna for receiving the inbound RF signal 58.

In response to the outbound RF signal 54, the antenna structure 48 receives the inbound RF signal 58. In one embodiment, the inbound RF signal 58 is a modulated, backscattered signal and is at a carrier frequency $F_B$ substantially the same as the carrier frequency $F_A$ of the outbound RF signal 54. In other embodiments, the inbound RF signal may be a modulated, backscattered signal at different carrier frequency $F_B$, such as at a subcarrier or subharmonic frequency, from the carrier frequency $F_A$ of the outbound RF signal 54.

The preprocessing module 70 receives the inbound RF signal 54 and is operable to process the inbound RF signal 58 to produce the preprocessed inbound RF signal 82. The preprocessed inbound RF signal 82 will include a desired RF signal component of the modulated backscattered signal at carrier frequency $F_B$. In addition, the preprocessed inbound RF signal 58 will include a blocking RF signal component. The blocking RF signal component includes a component of the outbound RF signal 54 at carrier frequency $F_A$ due to reflections of the outbound RF signal 54 back to the antenna structure 48.

The preprocessed inbound RF signal 54 is input to the mixing module 80. The mixing module 80 includes a splitter 108 and a mixer 110 having two parts: a first mixer 110a and a second mixer 11b. The splitter 108 is operable to split the preprocessed inbound RF signal 82. A first portion of the preprocessed inbound RF signal 82 is transmitted to mixer 110a and a second portion of the preprocessed inbound RF signal 82 is transmitted to mixer 110b. The mixing module 80 is operable to mix the preprocessed inbound RF signal 82 with the in-phase local oscillation signal $I_{LO}$ 84a to produce an in-phase down converted signal 86a and mix the preprocessed inbound RF signal 82 with the quadrature local oscillation signal $Q_{LO}$ 84b to produce a quadrature down converted signal 86b.

Since the blocking component of the preprocessed inbound RF signal 82 as well as the in-phase local oscillation signal $I_{LO}$ and the quadrature local oscillation signal $Q_{LO}$ include components of the outbound RF signal 54, two blocking RF signal components at $F_A-F_A$ and $F_A+F_A$ are produced by the mixer. The blocking RF signal component components at $F_A-F_A$ are partially cancelled by the mixer resulting in only certain DC components. Thus, the mixing module 80 is operable to minimize the blocking RF signal component in the preprocessed inbound RF signal 82. However, the higher frequency blocking components at $F_A+F_A$ remain as well as components at $F_A-F_B$ and at $F_A+F_B$ in the down converted signal 86.

The post processing module 74 receives the down converted signal 86 which in this embodiment includes both the in-phase down converted signal $I_{DCS}$ 86a and the quadrature down converted signal $Q_{DCS}$ 86b. The post processing module 74 is operable to process the down converted signals to produce a baseband signal 88, including both the in-phase baseband signal 88a and the quadrature baseband signal 88b. After processing, both the in-phase baseband signal 88a and the quadrature baseband signal 88b are transmitted to the ADC module 76. The ADC module is operable to digitize the in-phase baseband signal 88a and the quadrature baseband signal 88b and output two digitized signals as encoded inbound signal 60.

Figure 6:
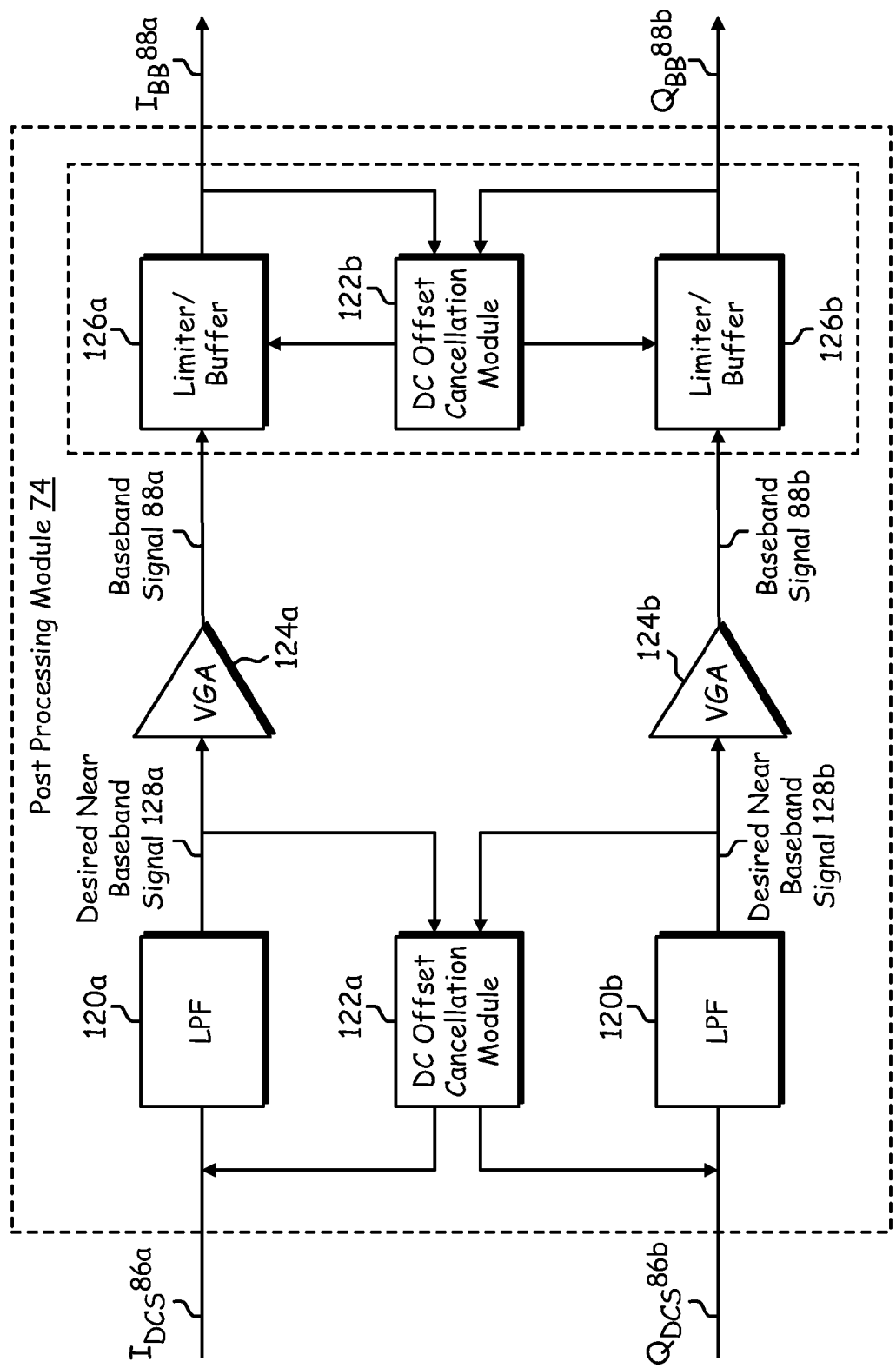
FIG. 6 is a schematic block diagram of one embodiment of a post processing module in a receiver section of an RFID reader in accordance with the present invention.

One embodiment of the post processing module 74 is illustrated with respect to FIG. 6. In this embodiment, the post processing module 74 includes a low pass filter 120, a DC offset cancellation module 122, a variable gain amplifier 124 and a limiter/buffer 126. In one embodiment, the low pass filter 120 includes a first low pass filter 120a for filtering the in-phase down converted signal $I_{DCS}$ 116a and a second low pass filter 120b for filtering the quadrature down converted signal $Q_{DCS}$ 116b. The low pass filters 120a and 120b are operable to filter the higher frequency blocking components at $F_A+F_A$ leaving the lower frequency desired components at $F_A-F_B$ and/or at $F_A+F_B$. For example, if a subcarrier frequency is received, then $F_A-F_B$ and $F_A+F_B$ are the two sideband subcarriers and the low pass filters 120a and 120b may be operable to pass one or both of the desired RF signal components for processing. If a subharmonic or other different frequency $F_B$ is received as the carrier frequency for the inbound RF signal 58, then the desired lower RF frequency signal component is at $F_A-F_B$ and the low pass filters 120a and 120b may be operable to pass this desired lower RF frequency signal component and filter the higher blocking RF frequency signal components at $F_A+F_B$ as well.

The low pass filters 120a and 120b produce a desired near baseband signal 128, wherein the desired near baseband signal 128 has a DC offset. The DC offset is partially from the cancelled blocking RF signal components and partially from noise due to the transmission path of the inbound RF signal 58, the power amplifier module 106 and oscillation module 68. The DC cancellation module 122a is operable to minimize the DC offset of the desired near baseband signal 128 to produce a baseband signal 130. The variable gain amplifier 124 amplifies the baseband signal 88. In this embodiment, the baseband signal 88 includes two components, the in-phase baseband signal 88a and the quadrature baseband signal 88b. The post processing module 74 may also include a second DC offset cancellation module 122b. The limiter/buffer 126a and 126b are operable to provide feedback from the outputs to the second DC offset cancellation module 122b. The DC offset cancellation module 122b is operable to be more finely calibrated to help minimize any remaining DC offset.

Figure 7:
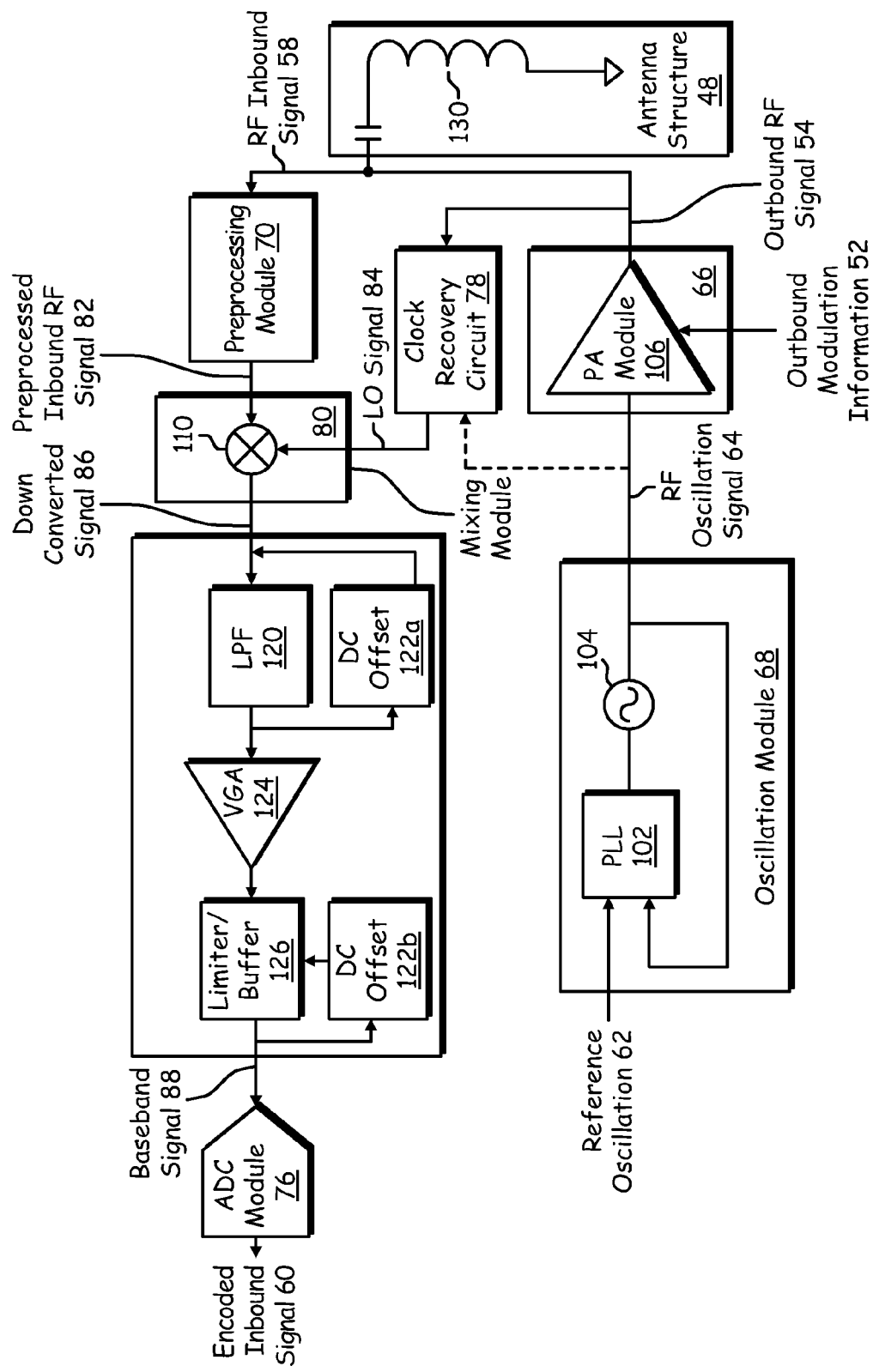
FIG. 7 is a schematic block diagram of another embodiment of a transceiver of an RFID reader in accordance with the present invention.

FIG. 7 is a schematic block diagram of another embodiment of an RFID reader 40 in accordance with the present invention. In this embodiment, the antenna structure 48 includes a coil antenna 130. The coil antenna 130 is operable to provide inductive or magnetic coupling to an RFID tag 20-30 in a near field mode of operation. Due to the close proximity of the RFID reader 40 and RFID tag 20-30 for near field mode of operation, the inbound RF signal 58 is generally the same phase as the outbound RF signal 54. Thus, the clock recovery circuit 78 does not include a phase shifter to output an in-phase and quadrature phase local oscillation signal. Instead, in this embodiment, the clock recovery circuit 78 includes a limiter or other circuit or processing module that is operable to receive the outbound RF signal 54 and output a local oscillation signal 84 with the same phase and carrier frequency $F_A$ as the outbound RF signal 54. In another embodiment, the clock recovery circuit is operable to receive the RF oscillation signal 64 and output a local oscillation signal 84 with the same phase and carrier frequency $F_A$ as the RF oscillation signal 64.

As in the previous embodiment, the preprocessed inbound RF signal 82 includes a desired RF signal component of the modulated, backscattered signal at carrier frequency $F_B$. In addition, the preprocessed inbound RF signal 58 includes a blocking RF signal component. The blocking RF signal component includes a component of the outbound RF signal 54 at carrier frequency $F_A$ due to reflections of the outbound RF signal 54 back to the antenna structure 48.

The mixing module 80 is operable to minimize the blocking RF signal component in the preprocessed inbound RF signal 82. The mixing module 80 includes a mixer 110 operable to mix the local oscillation signal 84 and the preprocessed inbound RF signal 82. Blocking components at $F_A-F_A$ are partially cancelled by the mixer resulting in only certain DC components. However, the higher frequency blocking components at $F_A+F_A$ remain as well as components at $F_A-F_B$ and at $F_A+F_B$ in the down converted signal 86. The post processing module 74 receives the down converted signal 86.

The post processing module 74 includes a low pass filter 120, a DC offset cancellation module 122, a variable gain amplifier 124 and a limiter/buffer 126. The low pass filter 120 is operable to filter the higher blocking RF frequency signal components at $F_A+F_A$ leaving the desired lower RF frequency signal components at $F_A-F_B$ and/or at $F_A+F_B$.

The low pass filter 120 produces a desired near baseband signal 128, wherein the desired near baseband signal 128 has a DC offset. The DC offset is partially from the cancelled blocking RF signal components and partially from noise due to the transmission path of the inbound RF signal 58, power amplifier module 106 and oscillation module 68. The DC cancellation module 122a is operable to minimize the DC offset of the desired near baseband signal 128 to produce a baseband signal 88. The variable gain amplifier 124 amplifies the baseband signal 88. The post processing module 74 may also include a second DC offset cancellation module 122b. The limiter/buffer 126 is operable to provide feedback to the second DC offset cancellation module 122b. The DC offset cancellation module 122b is operable for fine calibrations to help minimize any remaining DC offset. After processing, the baseband signal 88 is transmitted to the ADC module 76. The ADC module is operable to digitize the baseband signal 88 and produce the encoded inbound signal 60.

The embodiments of the RFID reader 40 help minimize the blocking RF signal components due to the reflections of the outbound RF signal 54. This improvement allows the RFID reader to operate in full duplex mode and be able to transmit the outbound RF signal 54 while receiving the inbound RF signal 58. In one embodiment, the RFID reader 40 may transmit the continuous wave, unmodulated outbound RF signal 54 to power an RFID tag 20-30 while receiving the inbound RF signal 58.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The invention claimed is:

1. A radio frequency identification (RFID) reader comprises:
   a transmitter section that includes:
      an oscillation module coupled to convert a reference oscillation into a radio frequency (RF) oscillation;
      a power amplifier module coupled to amplify and to modulate the RF oscillation in accordance with outbound modulation information to produce an outbound RF signal;
   a receiver section that includes:
      a clock recovery circuit coupled to generate at least one local oscillation (LO) signal from the outbound RF signal;
      a preprocessing module operable to process an inbound RF signal to produce a preprocessed inbound RF signal, wherein the outbound RF signal is at a first carrier frequency and the inbound RF signal is at a second carrier frequency and wherein the preprocessed inbound RF signal includes a desired RF signal component and a blocking RF signal component and wherein the blocking RF signal component includes a component of the outbound RF signal at a first carrier frequency;
      a mixing module coupled to mix the preprocessed inbound RF signal with the at least one LO signal to produce a down converted signal;
      a post processing module operable to process the down converted signal to produce a baseband signal, wherein the post processing module includes one or more low pass filters operable to filter the in-phase component of the down converted signal and the quadrature component of the down converted signal to produce a desired near baseband signal; and
      an analog to digital conversion module coupled to convert the baseband signal into an encoded inbound signal.

2. The RFID reader of claim 1, wherein the clock recovery circuit comprises:
   a phase shifter circuit coupled to convert the outbound RF signal into an in-phase LO signal and a quadrature LO signal.

3. The RFID reader of claim 2, wherein the mixing module comprises:
   a splitter to split the preprocessed inbound RF signal into a first preprocessed inbound RF signal and a second preprocessed inbound RF signal;
   a first mixer to mix the first preprocessed inbound RF signal with the in-phase LO signal to produce an in-phase component of the down converted signal; and
   a second mixer to mix the second preprocessed inbound RF signal with the quadrature LO signal to produce a quadrature component of the down converted signal.

4. The RFID reader of claim 3, wherein the one or more low pass filters are operable to filter the in-phase component of the down converted signal and the quadrature component of the down converted signal to filter the blocking RF signal component at a higher frequency and pass the desired RF signal component at a lower frequency to produce the desired near baseband signal, wherein the desired near baseband signal has a DC offset;
   a DC cancellation module operable to substantially cancel the DC offset of the desired near baseband signal to produce a baseband signal; and
   a variable gain amplifier to amplify the baseband signal.

5. The RFID reader of claim 4, further comprising:
   an antenna structure, wherein the antenna structure includes a far field antenna operable to transmit the outbound RF signal using RF coupling and receive the inbound RF signal using RF coupling.

6. The RFID reader of claim 1, wherein the clock recovery circuit comprises:
   a limiter circuit coupled to convert the outbound RF signal into the LO signal.

7. The RFID reader of claim 6, wherein the mixing module comprises:
   a mixer to mix the preprocessed inbound RF signal with the LO signal to produce the down converted signal.

8. The RFID reader of claim 7, wherein the post processing module comprises:
   a low pass filter operable to filter the down converted signal to produce a desired near baseband signal, wherein the desired near baseband signal has a DC offset;

a DC cancellation module operable to substantially cancel the DC offset of the desired near baseband signal to produce a baseband signal; and a variable gain amplifier to amplify the baseband signal.

9. The RFID reader of claim 8, further comprising:
an antenna structure, wherein the antenna structure includes a near field coil antenna operable to transmit the outbound RF signal using inductive coupling and receive the inbound RF signal using inductive coupling.

10. The RFID reader of claim 1, further comprising:
a baseband processing module operable to:
  convert outbound data into the outbound modulation information; and
  convert the encoded inbound signal into inbound data.

11. A transceiver, comprising:
a transmitter section, including:
  an oscillation module operable to generate a radio frequency (RF) oscillation signal; and
  a power amplifier module coupled to amplify and to modulate the RF oscillation signal in accordance with outbound modulation information to generate an outbound RF signal; and
a receiver section, including:
  a clock recovery circuit coupled to generate an in-phase local oscillation signal and a quadrature local oscillation signal from the outbound RF signal generated by the transmitter section;
  a preprocessing module operable to process an inbound RF signal to produce a preprocessed inbound RF signal, wherein the preprocessed inbound RF signal includes a desired RF signal component and a blocking RF signal component and wherein the blocking RF signal component includes a component of the outbound RF signal and wherein the outbound RF signal is at a first carrier frequency and the inbound RF signal is at a second carrier frequency;
  a mixing module operable to minimize the blocking RF signal component in the preprocessed inbound RF signal by mixing the preprocessed inbound RF signal with the in-phase local oscillation signal to produce an in-phase down converted signal and by mixing the preprocessed inbound RF signal with the quadrature local oscillation signal to produce a quadrature down converted signal;
  a post processing module operable to process the in-phase down converted signal and the quadrature down converted signal to substantially remove the blocking RF signal component and produce a desired near baseband signal, wherein the post processing module includes a low pass filter to pass the desired RF frequency signal component and filter the blocking RF frequency signal component; and
  an analog to digital conversion module coupled to convert the desired near baseband signal into an encoded inbound signal.

12. The transceiver of claim 11, wherein the clock recovery circuit comprises:
a phase shifter circuit coupled to convert the outbound RF signal into the in-phase local oscillation signal and the quadrature local oscillation signal.

13. The transceiver of claim 12, wherein the post processing module comprises:
a DC cancellation module operable to substantially cancel DC offset of the desired near baseband signal; and
a variable gain amplifier to amplify the desired near baseband signal.

14. The transceiver of claim 13, wherein the outbound RF signal is at a first carrier frequency and the inbound RF signal is at a second carrier frequency.

15. The transceiver of claim 14, wherein the inbound RF signal is a modulated backscatter signal derived from the outbound RF signal and the first carrier frequency and the second carrier frequency are substantially the same frequency.

16. A radio frequency identification (RFID) reader, comprising:
a baseband processing module operable to generate outbound modulation information;
a transmitter section operable to convert the outbound modulation information into an outbound RF signal; and
a receiver section operable to:
  generate at least one local oscillation (LO) signal from the outbound RF signal;
  process an inbound RF signal to produce a preprocessed inbound RF signal, wherein the preprocessed inbound RF signal includes a desired RF signal component and a blocking RF signal component and wherein the blocking RF signal component includes a component of the outbound RF signal;
  mix the preprocessed inbound RF signal with the at least one LO signal to produce a down converted signal;
  process the down converted signal to pass the desired RF frequency signal component and filter the blocking RF frequency signal component to produce a baseband signal; and
  convert the baseband signal into an encoded inbound signal.

17. The RFID reader of claim 16, wherein the receiver section is operable to:
convert the outbound RF signal into an in-phase LO signal and a quadrature LO signal.

18. The RFID reader of claim 17, wherein receiver section is operable to:
split the preprocessed inbound RF signal into a first preprocessed inbound RF signal and a second preprocessed inbound RF signal;
mix the first preprocessed inbound RF signal with the in-phase LO signal to produce an in-phase component of the down converted signal; and
mix the second preprocessed inbound RF signal with the quadrature LO signal to produce a quadrature component of the down converted signal.

19. The RFID reader of claim 18, further comprising:
an antenna structure operable to transmit the outbound RF signal using RF coupling and receive the inbound RF signal using RF coupling.

20. The RFID reader of claim 16, wherein the receiver section is operable to:
filter the down converted signal to produce a desired near baseband signal, wherein the desired near baseband signal has a DC offset;
cancel the DC offset of the desired near baseband signal to produce a baseband signal; and
amplify the baseband signal.

21. The RFID reader of claim 20, further comprising:
an antenna structure operable to transmit the outbound RF signal using inductive coupling and receive the inbound RF signal using inductive coupling.

* * * * *